United States Patent
Raghuraman (10) Patent No.: US 8,095,083 B2
(45) Date of Patent: Jan. 10, 2012

(54) METHOD AND SYSTEM FOR MULTIPLE SHARED ANTENNA MOBILE DEVICES

(75) Inventor: Shankara Raghuraman, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 856 days.

(21) Appl. No.: 12/034,201

(22) Filed: Feb. 20, 2008

(65) Prior Publication Data
US 2009/0207082 A1  Aug. 20, 2009

(51) Int. Cl.
*H04B 1/02* (2006.01)
*H04K 3/00* (2006.01)

(52) U.S. Cl. .................. 455/101; 455/132; 455/277.1

(58) Field of Classification Search .......... 455/41.2, 455/101, 103, 132, 137, 272, 277.1, 277.2, 455/552.1, 553.1; 375/267, 347
See application file for complete search history.

(56) References Cited

U.S. PATENT DOCUMENTS

| 6,560,443 B1 * | 5/2003 | Vaisanen et al. ............... 455/73 |
| 6,564,069 B1 * | 5/2003 | Ishida ......................... 455/552.1 |
| 2006/0109921 A1 * | 5/2006 | Ji et al. ........................... 375/260 |

* cited by examiner

*Primary Examiner* — Lee Nguyen
(74) *Attorney, Agent, or Firm* — McAndrews, Held & Malloy Ltd.

(57) ABSTRACT

A wireless device may comprise a plurality of antennas that may be utilized during communications via various wireless interfaces. The wireless interfaces may comprise mobile interfaces, wireless personal area network (WPAN) interfaces, and/or wireless local area network (WLAN). The plurality of antennas may be utilized during a communication via a wireless interface in the mobile device. The mobile device may switch among antennas in the plurality of antennas utilizing one or more RF switches to enable utilizing best path for transmitted and/or received RF signals during the wireless communication. The mobile device may also perform signal combining of RF signals received via the plurality of antenna, and to enable a receiving end to perform signal combining of RF signals transmitted via the mobile device. A multiple-input- multiple-output (MIMO) combiner may be utilized to perform signal combing; the MIMO combiner may utilize maximal ratio combining to perform signal combining and equalization.

24 Claims, 5 Drawing Sheets

METHOD AND SYSTEM FOR MULTIPLE SHARED ANTENNA MOBILE DEVICES

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to video processing. More specifically, certain embodiments of the invention relate to a method and system for sharing multiple antennas in mobile devices.

BACKGROUND OF THE INVENTION

The field of wireless communication has seen dramatic growth the last few years. In today's world, most people use their wireless devices, for example mobile phones, for various purposes, business and personal, on a constant and daily basis. Society is truly becoming a wireless one. A lot of wireless solutions have been introduced, and have made tremendous strides into everyday's life.

Mobile phones have become a near absolute necessity in today's world. While mobile technology originally evolved from traditional land-based communication technologies, and was merely intended to add an element of mobility to the traditional telephony service, this technology has grown beyond that initial purpose. Many modern mobile technologies, including such technologies as GSM/GPRS/EDGE, UMTS, and CDMA2000, incorporate substantial data capabilities. Most of today's mobile services comprise such features as text messaging, audio/video streaming, and web browsing. Modern mobile devices (phones) may be utilized to support additional services via other wireless interfaces; for example, wireless personal area networks (WPAN) and/or wireless local area network (WLAN) interfaces.

The use of wireless personal area networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies; for example Class 2 Bluetooth (BT) technology. While WPAN may be very beneficial for certain applications, other applications may require larger service areas and/or capabilities.

To satisfy such needs, other technologies have been developed to provide greater wireless service. Wireless local area networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Some WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, mobile technology may allow use of the mobile phone as a form of wireless modem that allows connecting a laptop, for example, to the internet via a mobile network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for sharing multiple antennas in mobile devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing multiple antennas in mobile devices. A wireless device may comprise a plurality of antennas that may be utilized during communications via various wireless interfaces. The wireless interfaces may comprise mobile interfaces, wireless personal area network (WPAN) interfaces, and/or wireless local area network (WLAN). The plurality of antennas may be utilized during a communication via one of multiple supported wireless interfaces via the mobile device. The mobile device may switch among any of the plurality of antennas utilizing one or more RF switches to enable utilizing the best path for handling transmitted and/or received RF signals during the wireless communication. The mobile device may also be enabled to perform combining of RF signals received via the plurality of antennas, and to enable a receiving end device to perform signal combining of RF signals transmitted from the mobile device. A multiple-input-multiple-output (MIMO) combiner may be utilized to perform signal combing; and the MIMO combiner may utilize maximal ratio combining to perform signal combining and equalization.

Figure 1:
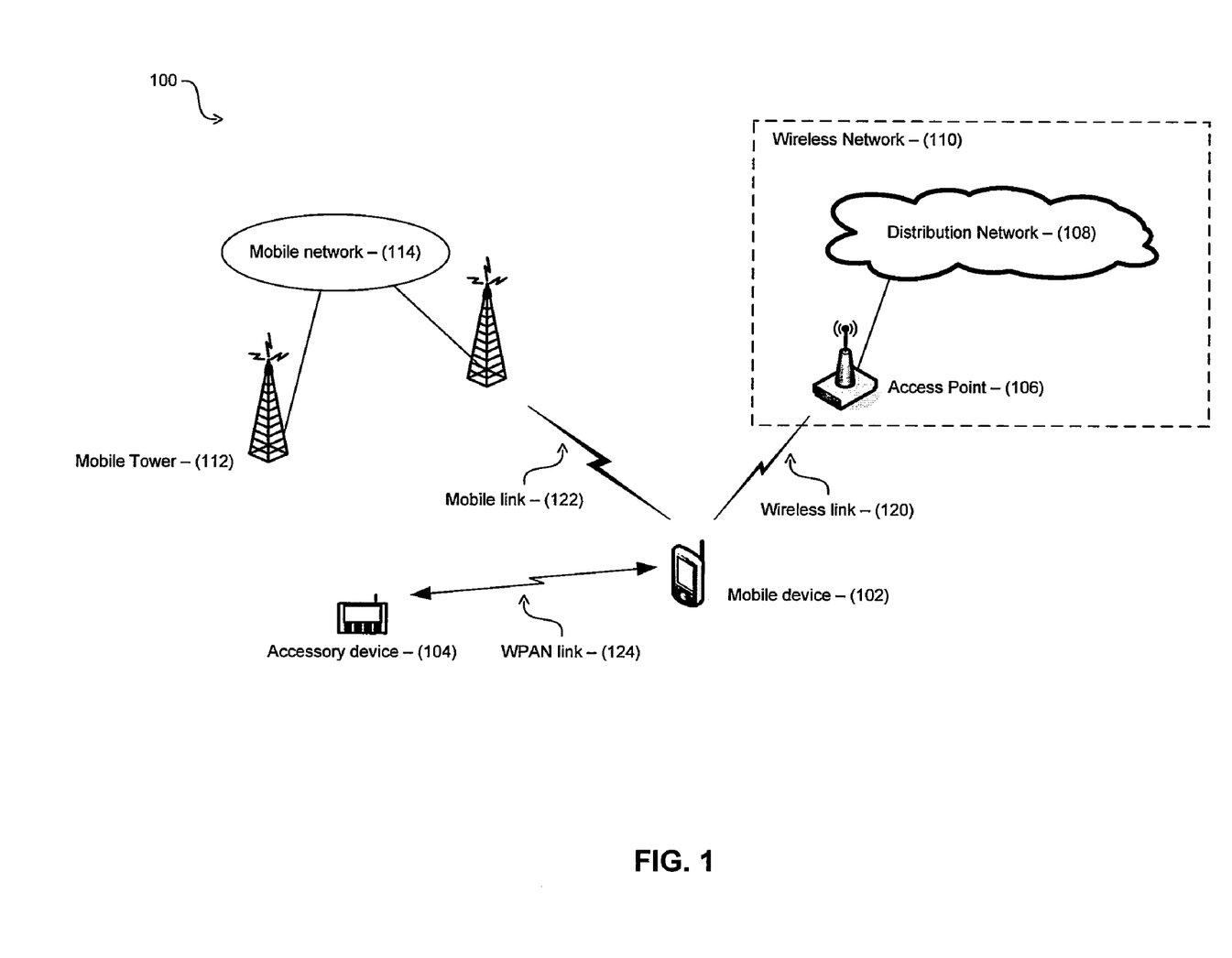
FIG. 1 is a block diagram that illustrates an exemplary communication setup between a mobile device and a plurality of wireless systems, in accordance with an embodiment of the invention.

FIG. 1 is a block diagram that illustrates an exemplary communication setup between a mobile device and a plurality of wireless systems, which may be utilized in accordance with an embodiment of the invention. Referring to FIG. 1, there is shown a mobile device 102, an accessory device 104, an access point 106, a distribution network 108, a wireless network 110, a mobile tower 112, a mobile network 114, a wireless link 120, a mobile link 122, and a wireless personal area network (WPAN) link 124.

The wireless network 110 may comprise a plurality of the access point 106, the distribution network 108, and suitable logic, circuitry and/or code that may enable communication via one or more wireless technologies. Exemplary wireless technologies may comprise IEEE 802.11 (WLAN) and variants thereof, and WiMAX (IEEE 802.16). The access point 106 may comprise suitable logic, circuitry, and/or code that may be utilized to provide the necessary access infrastructure for the mobile device 102 to access the wireless network 110. The distribution network 108 may comprise suitable logic, circuitry, and/or code that may be adapted to operate as a backbone network that may be responsible for transport and link functionality for a plurality of access points within the wireless network 110. The wireless link 120 may comprise an RF link that may utilize, for example, a standardized technology for local wireless access. For example, the wireless link 120 may correspond to an IEEE 802.11 (WLAN) and/or WiMAX (IEEE 802.16) RF connection between the mobile device 102 and the wireless network 110.

The mobile network 114 may comprise a plurality of the mobile towers 112 and/or base stations, and suitable logic, circuitry and/or code that may enable via a cellular technology. For example, the mobile network may comprise CDMA, WCDMA, CDMA2000, HSDPA, GSM, GPRS, EDGE, and/or UMTS infrastructure. The mobile tower 112 may comprise suitable logic, circuitry, and/or code that may be utilized to provide the necessary over the air access for the mobile device 102 to communicate with and/or via the mobile network 114. The mobile link 122 may comprise an RF link that may utilize, for example, a standardized cellular technology. For example, the mobile link 122 may correspond to a UMTS RF connection between the mobile device 102 and the mobile network 114.

The accessory device 104 may comprise suitable logic, circuitry and/or code that may enable performing some accessory functionality in conjunction with the use of the mobile device 102. For example, the accessory device 104 may comprise a hands-free headset. The mobile device 102 may communicate with the accessory device 104 via a short-range link such as WPAN link 124, for example. Other links such as ZigBee and an infrared link may be utilized The WPAN link 124 may comprise an RF link that may utilize, for example, a standardized technology for inter-device short range communication. For example, the WPAN link 124 may correspond to a Bluetooth and/or ZigBee RF connection between the accessory device 104 and the mobile device 102.

The mobile device 102 may comprise suitable logic, circuitry and/or code that may enable performing wireless communication via a plurality of wireless interfaces. For example, the mobile device 102 may be utilized to perform voice, video and/or text message peer-to-peer communication with other communication devices, mobile and/or land-based. The mobile device 102 may comprise, for example, a cellular phone that may be utilized to perform mobile communication via the mobile network 114. The mobile device 102 may also comprise suitable logic, circuitry and/or code that may enable performing additional functionality comprising, for example, Internet browsing, video and/or audio recording and/or playing. For example, the mobile device 102 may comprise a digital camera that may enable generating sill pictures and/or video streams. Also, the mobile device 102 may comprise a microphone that may enable generation of audio recordings. The mobile device 102 may also comprise suitable logic, circuitry and/or code that may enable utilizing the wireless network 110. For example, the wireless device 102 may be utilized as a modem that may enable a laptop to access the wireless network 110.

In operation, the mobile device 102 may utilize the wireless link 110 to access the wireless network 110 via the access point 106. The mobile device 102 may also utilize the mobile link 122 to access the mobile network 114 via the mobile tower 112 and the mobile device 102 may utilize the accessory device 104 via the WPAN link 124. The mobile device 102 may comprise a plurality of antennas that may be enable access to the mobile network 114, the wireless network 110, and/or the accessory device 104, via the mobile link 122, the wireless link 120, and/or the WPAN link 124, respectively.

While the antennas utilized in the mobile device 102 may comprise varying characteristics to suite each of the different wireless systems available via the mobile device 102, some and/or all of the antennas may still be utilized to support a wireless communication via each of the available wireless interfaces in the mobile device 102. For example, the mobile device 102 may be utilized in conjunction with a UMTS network, a WiFi network, and/or a Bluetooth device. Within the UMTS network, a device utilized as a 3G mobile platform may typically utilize a dedicated antenna for UMTS function. In this regard, the antenna may be used, for example, to transmit and/or receive RF signal within the 1.8-2.2 GHz frequency band. The 1885-2025 MHz frequency range may be utilized for uplink communication and the 2110-2200 MHz range may be utilized for downlink. WiFi and/or the Bluetooth RF signals may be transmitted and/or received within the 2.4 GHz band. While the WiFi transmission and/or reception may be performed via Bluetooth antennas, the WiFi network may require larger and better performance antenna than Bluetooth antenna may enable because WiFi features may demand higher data rates over longer distances. As such, the 2.4 GHz WiFi antenna utilized in a mobile device, for example the mobile device 102, may approach the size and/or gain of a UMTS antenna.

Consequently, in an embodiment of the invention, antennas utilized for UMTS, WiFi, and/or Bluetooth may comprise sufficiently compatible characteristics that may be enabled or disabled via suitable logic, circuit, and/or code may during UMTS, WiFi, and/or Bluetooth communication. The frequency separation between the UMTS bands and the 2.4 GHz band, which may be utilized for Bluetooth and/or WiFi transmission and/or reception, is only ~300-500 MHz. 2.4 GHz antennas utilized for Bluetooth and/or WiFi operation may be designed to also support the UMTS frequency band. The mobile device 102 may be modified and/or configured via suitable logic, circuitry, and/or code may be utilized to enable improved to enable optimal transmission and/or reception of UMTS RF signals via any of the available antennas in the mobile device 102. For example, it may determined, via the mobile device 102, that the WiFi antenna and/or the Bluetooth antenna may provide a more optimal communication path as compared to the dedicated UMTS antenna, and as a result, the WiFi antenna and/or the Bluetooth antenna may be selected to perform UMTS RF transmission and/or reception. Also, a combination of the available antennas may be utilized to optimize UMTS operation, wherein the signal-to-noise ration (SNR) may be improved, for example, by enabling use of diversity techniques via the plurality of the antennas. For example, it may determined, via the mobile device 102, that UMTS RF transmission and/or reception may be performed via WiFi antenna and/or the Bluetooth antenna, in conjunction with the dedicated UMTS antenna, to facilitate more optimal communication due to spatial diversity signal combining.

While the invention may be described based on UMTS, Bluetooth, and WiFi, the invention need not be limited to such combination. Rather, the invention may also be embodied substantially the same way in any mobile device that comprises a plurality of antennas corresponding to plurality of wireless interfaces, protocols and/or standards, and any combination of the plurality of antennas may be configured to enable optimal communication.

Figure 2A:
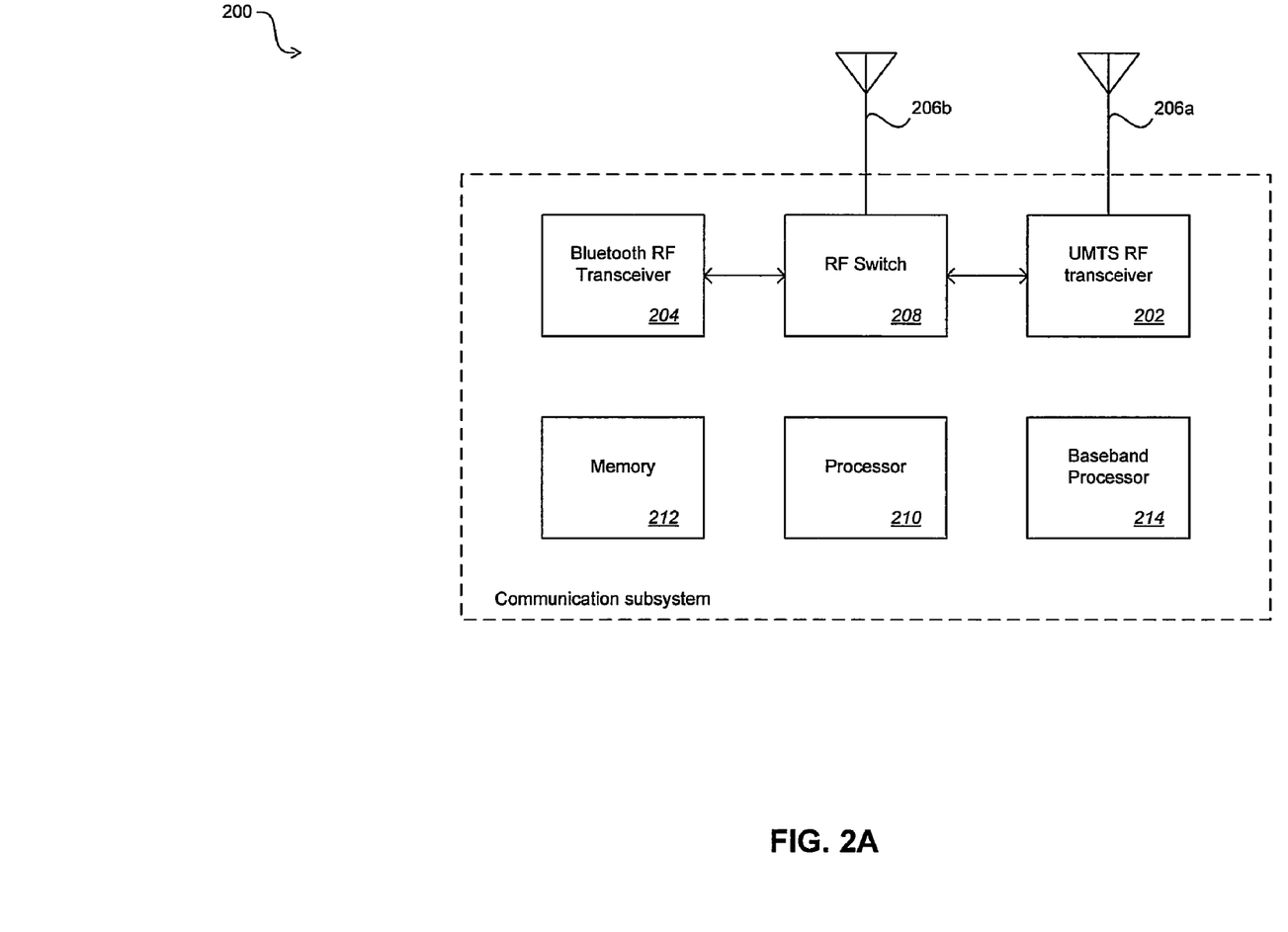
FIG. 2A is a block diagram that illustrates an exemplary communication system in a mobile device that enables selecting among a plurality of available antennas, in accordance with an embodiment of the invention.

FIG. 2A is a block diagram that illustrates an exemplary communication system in a mobile device that enables selecting among a plurality of available antennas, in accordance with an embodiment of the invention. Referring to FIG. 2A, there is shown a communication system 200, a UMTS RF transceiver 202, a Bluetooth RF transceiver 204, an antenna 206a, an antenna 206b, an RF switch 208, a processor 210, a memory 212, and a baseband processor 214.

The communication system 200 may comprise the UMTS RF transceiver 202, the Bluetooth RF transceiver 204, the antennas 206a and 206b, the RF switch 208, the processor 210, the memory 212, and the baseband processor 214. The communication system 200 may also comprise suitable logic, circuitry, and/or code that may enable receiving, transmitting, and processing RF signals. For example, the communication system 200 may be integrated within a mobile device, for example the mobile device 102, to enable RF signal transmission and/or reception, during UMTS and/or Bluetooth communication, for example, via the mobile link 122 and/or the WPAN link 124, respectively.

The antenna 206a may comprise suitable logic, circuitry, and/or code that may enable reception and/or transmission of RF signals; and the antenna 206a may be communicatively coupled to the UMTS RF transceiver 202. The UMTS RF transceiver 202 may comprise suitable logic, circuitry, and/or code that may enable processing of transmitted and/or received UMTS RF signals. For example, the UMTS RF transceiver 202 may enable receiving RF signals at, for example, approximately the 1.8-2.2 GHz frequency band. In this regard, the UMTS RF transceiver 202 may be enabled to generate signals, such as local oscillator signals, for the reception and processing of UMTS RF signals. The UMTS RF transceiver 202 may be enabled to perform necessary conversions between received RF signals and baseband frequency signals that may be processed via one or more digital baseband processors, for example.

The UMTS RF transceiver 202 may be enabled to perform direct conversion of the received RF signals to a baseband frequency signal, for example. In some instances, the UMTS RF transceiver 202 may enable analog-to-digital conversion of baseband signal components before transferring the components to digital baseband processors. The UMTS RF transceiver 202 may also enable transmission of UMTS RF signals at, for example, approximately 1.8-2.2 GHz frequency band. In this regard, the UMTS RF transceiver 202 may be enabled to generate signals, such as local oscillator signals, for the transmission and processing of UMTS signals. The UMTS RF transceiver 202 may be enabled to perform necessary conversions between baseband frequency signals, generated via digital baseband processors for example, and transmitted RF signals. In some instances, the UMTS RF transceiver 202 may enable digital-to-analog conversion of baseband signals components.

The antenna 206b may comprise suitable logic, circuitry, and/or code that may enable reception and/or transmission of RF signals; and the antenna 206b may be communicatively coupled to the RF switch 208. The RF switch 208 may comprise suitable logic, circuitry, and/or code that may enable switching and/or routing of signals generated and/or processed via the UMTS RF transceiver 202 and/or the Bluetooth RF transceiver 204, which may be transmitted and/or received via the antenna 206b.

The Bluetooth RF transceiver 204 may comprise suitable logic, circuitry, and/or code that may enable processing of transmitted and/or received Bluetooth RF signals, via the RF switch 208 and the antenna 206b. For example, the Bluetooth RF transceiver 204 may enable receiving RF signals at, for example, approximately the 2.4 GHz frequency band. In this regard, the Bluetooth RF transceiver 204 may be enabled to generate signals, such as local oscillator signals, for the reception and processing of Bluetooth RF signals. The Bluetooth RF transceiver 204 may be enabled to perform necessary conversions between received RF signals and baseband frequency signals that may be proceed via digital baseband processors, for example. The Bluetooth RF transceiver 204 may perform direct down-conversion of the received RF signals to a baseband frequency signal, for example. In some instances, the Bluetooth RF transceiver 204 may enable analog-to-digital conversion of baseband signal components before transferring the components to digital baseband processors. The Bluetooth RF transceiver 204 may also enable transmission of Bluetooth RF signals via the RF switch 208 and/or the antenna 206b at, for example, approximately 2.4 GHz frequency band. In this regard, the Bluetooth RF transceiver 204 may be enabled to generate signals, such as local oscillator signals, for the transmission and/or processing of Bluetooth signals. The Bluetooth RF transceiver 204 may be enabled to perform necessary conversions between baseband frequency signals, generated via digital baseband processors for example, and transmitted RF signals. In some instances, the Bluetooth RF transceiver 204 may enable digital-to-analog conversion of baseband signals components.

The processor 210 may comprise suitable logic, circuitry, and/or code that may enable control and/or data processing operations in the communication system 200. The processor 210 may be utilized to control at least a portion of the memory 212, the UMTS RF transceiver 202, the Bluetooth RF transceiver 204, and/or the RF switch 208. In this regard, the processor 210 may generate at least one signal for controlling operations within the communication system 200. The processor 210 may also enable execution of applications that may be utilized by the communication system 200. For example, the processor 210 may execute applications that may enable displaying and/or interacting with content received via RF signals in the communication system 200. The processor 210 may also comprise suitable logic, circuitry, and/or code that may enable baseband frequency signals processing. In this regard, the processor 210 may process and/or handle signals received from the UMTS RF transceiver 202 and/or the Bluetooth RF transceiver 204; and/or signals that may be transmitted via the UMTS RF transceiver 202 and/or the Bluetooth RF transceiver 204.

The memory 212 may comprise suitable logic, circuitry, and/or code that may enable storage of data, code, and/or other information utilized by the communication system 200. For example, the memory 212 may be utilized for storing processed data generated, and/or execution code that may be utilized by the processor 210. The memory 212 may also be utilized to store information, such as configuration information, that may be utilized to control the operation of at least a portion of the communication system 200. For example, the memory 212 may comprise information necessary to configure the UMTS RF transceiver 202 and/or the Bluetooth RF transceiver 204, to enable reception and/or transmission of RF signals in appropriate frequency bands.

The baseband processor 214 may comprise suitable logic, circuitry, and/or code that may be adapted to process received baseband signals via RF transceivers. The baseband processor 214 also may comprise suitable logic, circuitry, and/or code that may be adapted to process baseband signals for transmission via RF transceivers. For example, the baseband processor 214 may be utilized to process baseband signals transmitted and/or received via the UMTS RF transceiver 202 and/or the Bluetooth RF transceiver 204 in the communication system 200. Although the baseband processor 214 may be depicted as a single block, the invention need not be so limited. Accordingly, other embodiments of the invention may comprise a plurality of baseband processors for processing signals to and/or from available RF transceivers.

In operation, the communication system 200 may enable RF transmission and/or reception pertaining to different interfaces and/or protocols. The processor 210, the baseband processor 214, and the memory 212 may be utilized to control and support RF communication and/or signal processing via the communication system 200. For example, UMTS RF signals may be received and/or transmitted via the antenna 206a and the UMTS RF transceiver 202. The received UMTS RF signals may be converted from/to baseband signals, which may be processed via the baseband processor 214. Similarly, Bluetooth RF signals may be received and/or transmitted via the antenna 206b, the RF switch 208, and the Bluetooth RF transceiver 204. The received Bluetooth RF signals may be converted from/to baseband signals, which may be processed via the baseband processor 214.

In an embodiment of the invention, the communication system 200 may enable switching among available antennas during RF transmission and/or reception pertaining to a wireless interface. For example, the antennas 206a and 206b may enable performing simultaneous RF transmission and/or reception operations, pertaining to the UMTS interfaces. UMTS RF signals may be received concurrently via antenna 206a and the UMTS RF transceiver 202; and via the antenna 206b, the RF switch 208, and the UMTS RF transceiver 202. The processor 210, the memory 212, and/or the baseband processor 214 may enable processing the received RF signals to determine which path may provide better performance. Path determination may be performed dynamically wherein the two different antenna setups may be continually analyzed to enable selecting the path or paths that may provide improved or optimal reception and/or less interference, based on SNR and/or received signal strength indication (RSSI) measurements and/or calculations, for example. On the uplink, UMTS RF signals corresponding to baseband signals generated via the baseband processor 214 for example, may be transmitted either via the UMTS RF transceiver 202 and antenna 206a, or via the UMTS RF transceiver 202, the RF switch 208, and the antenna 206b. The determination of the antenna setup that may be utilized may be based on a determination of the path performance, which may be based on, for example, analyzing the performance of the path on the downlink. For example, paths that may be determined to be optimal on the downlink, based on SNR and/or RSSI measurements and/or calculations, may also be utilized in the uplink. Also, antenna gain adjustments may be performed in the communication system 200 to enable performing switching among available antennas during RF transmission and/or reception pertaining to a wireless interface.

Figure 2B:
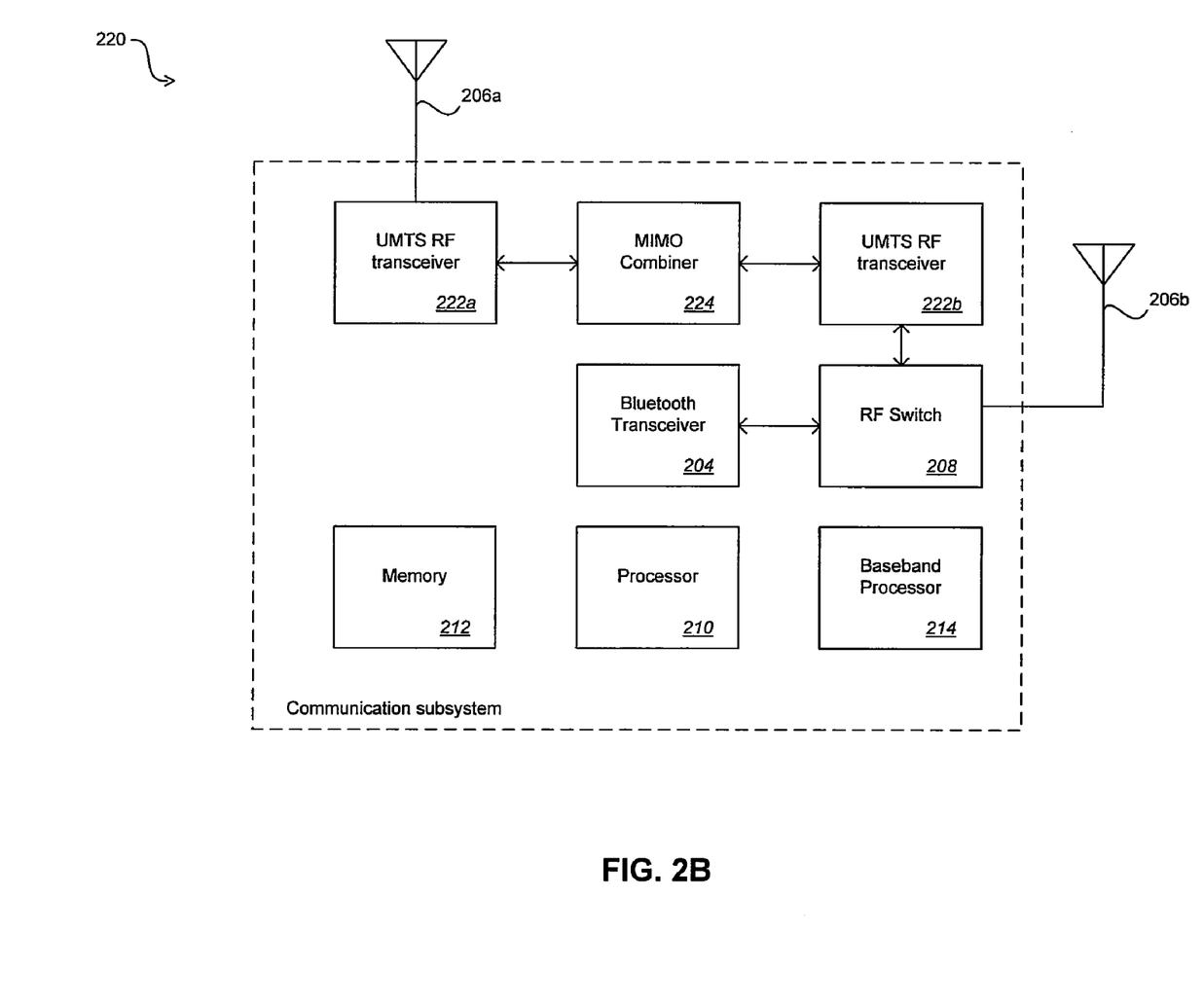
FIG. 2B is a block diagram that illustrates an exemplary communication system in a mobile device that enables signal combining among a plurality of available antennas, in accordance with an embodiment of the invention.

FIG. 2B is a block diagram that illustrates an exemplary communication system in a mobile device that enables signal combining among a plurality of available antennas, in accordance with an embodiment of the invention. Referring to FIG. 2B, there is there is shown a communication system 220, the Bluetooth RF transceiver 204, the antennas 206a and 206b, the RF switch 208, the processor 210, the memory 212, the baseband processor 214, UMTS transceivers 222a and 222b, and a multiple-input-multiple-output (MIMO) combiner 224.

The communication system 220 may comprise the Bluetooth RF transceiver 204, the antennas 206a and 206b, the RF switch 208, the processor 210, the memory 212, the baseband processor 214, the UMTS transceivers 222a and 222b, and the MIMO combiner 224 The communication system 220 may also comprise additional suitable logic, circuitry, and/or code that may enable receiving, transmitting, and processing RF signals. For example, the communication system 220 may be integrated within a mobile device, for example, the mobile device 102, to enable RF signal transmission and/or reception, during UMTS and/or Bluetooth communication, for example, via the mobile link 122 and/or the WPAN link 124, respectively, wherein the signal combining may be performed, via the antennas 206a and 206b, during UMTS transmission and/or reception.

The Bluetooth RF transceiver 204, the antennas 206a and 206b, the RF switch 208, the processor 210, the memory 212, and the baseband processor 214, may be substantially as described with respect to FIG. 2B. Each of the UMTS transceivers 222a and 222b may be similar to the UMTS RF transceiver 202, substantially as described with respect to FIG. 2A.

The MIMO combiner 224 may comprise suitable logic, circuitry, and/or code that may enable performing RF signal combining. For example, the MIMO combiner may enable combining RF signals received via plurality of antenna to perform spatial diversity in RF reception.

In operation, the communication system 220 may enable RF transmission and/or receptions pertaining to different interfaces, substantially similar to the communication system 200 as described in FIG. 2B. The communication system 220 may also enable switching among available antennas during RF transmission and/or reception pertaining to a wireless interface, substantially similar to the communication system 200 as described in FIG. 2B. In this regard, the antennas 206a and 206b may enable performing simultaneous RF transmission and/or reception operations, pertaining to the UMTS interfaces. The UMTS RF signals may be received concurrently via antenna 206a and the UMTS RF transceiver 222a; and via the antenna 206b, the RF switch 208, and the UMTS RF transceiver 222b. The processor 210, the memory 212, and/or the baseband processor 214 may enable processing the received RF signals to determine which path may provide better performance. Path determination may be performed dynamically wherein the two different antenna setups may be continually analyzed to enable selecting the path that may provide improved reception and/or less interference, based on SNR and/or RSSI calculations for example. On the uplink, UMTS RF signals corresponding to baseband signals generated via the baseband processor 214, for example, may be transmitted either via the UMTS RF transceiver 222a and antenna 206a, or via the UMTS RF transceiver 222b, the RF switch 208, and the antenna 206b. The determination of the antenna setup that may be utilized may be based on a determination of the path performance, which may be based on, for example, analyzing the performance of the path on the downlink. For example, paths that may be determined to be optimal on the downlink, based on SNR and/or RSSI calculations, may also be utilized in the uplink.

In an embodiment of the invention, the communication system 220 may additionally enable performing signal combining via available antennas during RF transmissions and/or receptions pertaining to a wireless interface. For example, UMTS RF signals received and/or transmitted via the antennas 206a and 206b may be combined during UMTS communications. In the downlink, UMTS RF signals may be received concurrently via antenna 206a and the UMTS RF transceiver 222a and via the antenna 206b, the RF switch 208, and the UMTS RF transceiver 222b. The received UMTS signals may then be combined via the MIMO combiner 224 and the combined RF signals may subsequently be processed via the baseband processor 214. The use of the MIMO combiner 224 and/or baseband processor 214 may enable performing spatial diversity, for example, to reduce interference and/or to improve signal-to-noise ratio (SNR). On the uplink, UMTS RF signals, corresponding to baseband signals generated via the baseband processor 214, for example, may be transmitted simultaneously via the UMTS RF transceiver 202 and antenna 206a and via the UMTS RF transceiver 202, the RF switch 208, and the antenna 206b. This simultaneous transmission may enable a receiving entity, for example the mobile tower 112, to utilize signal combining techniques while receiving UMTS RF signals transmitted via the communication system 220.

While the communication system 220 may be described based on UMTS and Bluetooth transceivers, and with RF switching and combining of only on UMTS RF signals via available antennas, the invention need not be so limited. Accordingly, the communication system 220 may support additional or different wireless interfaces and/or protocols. The communication system 220 may also be enabled to perform RF switching and/or combining of any of supported wireless interfaces, via some and/or all of available antenna in the system. Also, antenna gain adjustments may be performed in the communication system 200 to enable performing switching and/or signal combining among available antennas during RF transmission and/or reception pertaining to a wireless interface.

Figure 2C:
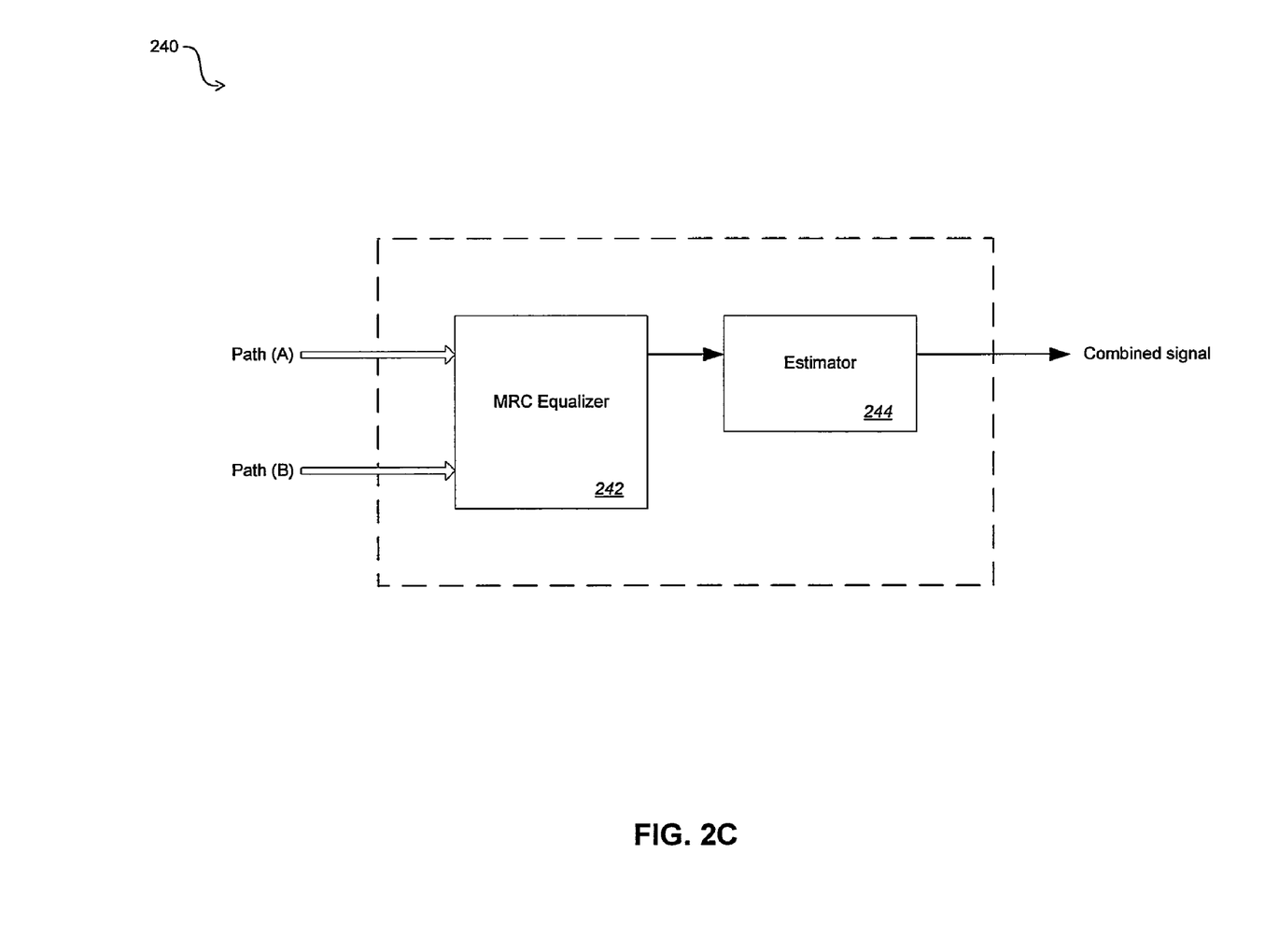
FIG. 2C is a block diagram that illustrates an exemplary signal combiner in a mobile device that enables signal combining among a plurality of available antennas, in accordance with an embodiment of the invention.

FIG. 2C is a block diagram that illustrates an exemplary signal combiner in a mobile device that enables signal combining among a plurality of available antennas, in accordance with an embodiment of the invention. Referring to FIG. 2C, there is there is shown a combiner system 240, a maximal ratio combining (MRC) equalizer 242, and an estimator 244.

The combiner system 240 may comprise the MRC equalizer 242 and the estimator 244 and may comprise suitable logic, circuitry, and/or code that may enable performing RF signal combining operations. The combiner system 240 may be integrated within the MIMO 224, for example, to enable performing RF signal combining operations on UMTS RF signals in the communication system 220. The MRC equalizer 242 may comprise suitable logic, circuitry, and/or code that may enable performing signal equalization based on maximal ratio combining of received RF signals. The estimator 244 may comprise suitable logic, circuitry, and/or code that may enable performing necessary signal processing estimation operations on RF signals received and/or combined via the MRC equalizer 242.

In operation, the combiner system 240 may enable maximal ratio combining of a plurality of signals. The combiner system 240 may be utilized via the MIMO 224, for example, to enable performing RF signal combining operations on UMTS RF signals in the communication system 220. The RF signals corresponding to a single communication may be received via two different paths, Path A and Path B. For example, in the communication system 220, Path A may correspond to UMTS RF signals received via the antenna 206a and the UMTS RF transceiver 222a while Path B may correspond to UMTS RF signals received via the antenna 206b, the RF switch 208, and the UMTS RF transceiver 222b.

The RF signals received, via Path A and Path B, in the MRC equalizer 242 may be combined, based on maximal ratio combining techniques, and resultant signals may then be equalized. The signals may then be fed into the estimator 244. The signals may then be adjusted in the estimator 244, wherein distortion caused by interference and/or noise may be reduced in the resultant signals based on preprogrammed and/or empirical data.

In an embodiment of the invention where the combiner system 240 may be utilized in the communication system 220, the processor 210 and/or the memory 212 may control and/or manage combining, equalization, and/or estimation operations performed via the MRC equalizer 242 and/or the estimator 244. Additionally, the MRC equalizer 242 and/or the estimator 244 may be reprogrammable, wherein data and/or code utilized during operations may be modifiable dynamically and/or prior to RF reception.

Figure 3:
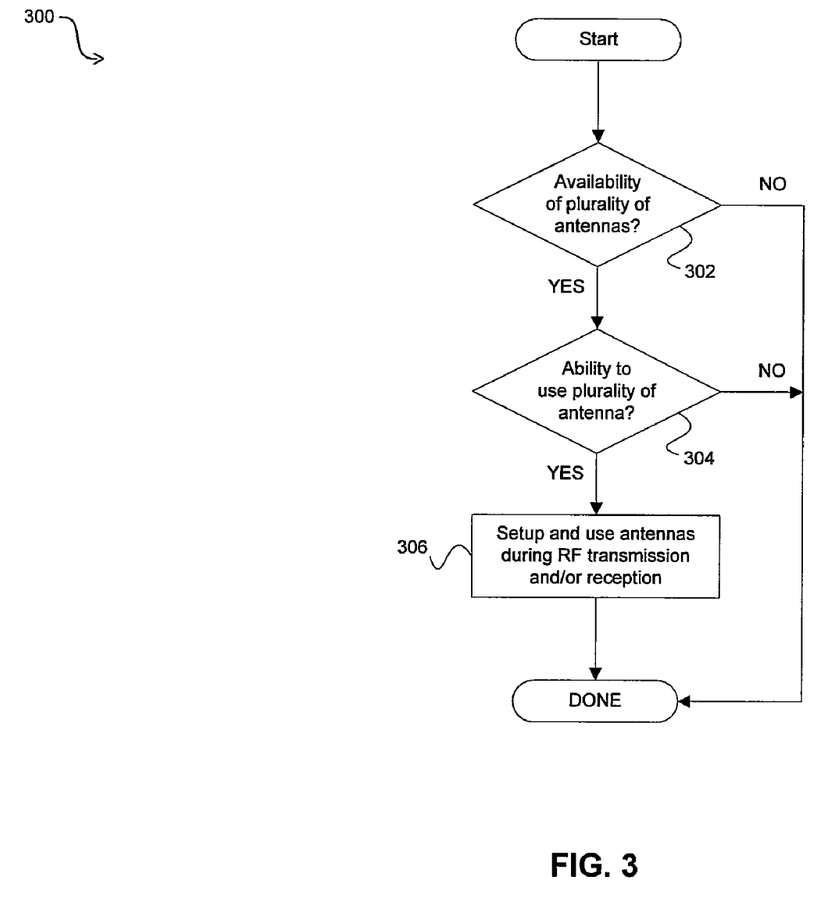
FIG. 3 is an exemplary flow diagram for sharing a plurality of antennas in a mobile device during wireless communication, in accordance with an embodiment of the invention.

FIG. 3 is an exemplary flow diagram for sharing a plurality of antennas in a mobile device during wireless communication, in accordance with an embodiment of the invention. Referring to FIG. 3, there is shown a flow chart 300 comprising a plurality of exemplary steps, which may enable utilizing multiple shared antennas in a mobile device.

In step 302, a determination of availability of a plurality of antenna in a mobile device may be performed. For example, in the mobile device 102, may be determined whether plurality of antennas that may be utilized with the various supported wireless interfaces may be available. This determination may depend, for example, on suitability of existing antennas that may be dedicated for use with other wireless protocols based on proximity of frequency bands utilized with different supported wireless protocols. In instances where it is determined that there may not be a plurality of antennas, the plurality of exemplary steps may terminate. Returning to step 302, in instances where it is determined that there may be a plurality of antennas; the plurality of exemplary steps may proceed to step 304.

In step 304, it may be determined whether an existing plurality of antennas may be utilized during a communication via a wireless interface may be performed. For example, in a mobile device, for example the mobile device 102, that may comprise the communication system 220, it may be determined whether the existing plurality of antennas, 206a and 206b, may be utilized during UMTS communications. The transmission and/or reception bands of the UMTS and Bluetooth interfaces may be sufficiently close that antennas used in UMTS and Bluetooth communications may be used interchangeably, and/or with little modification in circuitry, logic, and/or code. Additionally, the determination of whether to the existing plurality of antennas may also depend on availability of one or more of the antennas. For example, while Bluetooth antennas may be utilized during UMTS communications, they may not may available where they may be utilized concurrently to perform Bluetooth communications. In instances where it is determined that an existing plurality of antennas may not be utilized during a communication via a wireless interface, the plurality of exemplary steps may terminate. Returning to step 304, in instances where it is determined that an existing plurality of antennas may be utilized during communication via a wireless interface; the plurality of exemplary steps may proceed to step 306.

In step 306, the plurality of antennas may be setup and/or utilized during a communication via a wireless interface. The plurality of antennas may be utilized, for example, to switch between the antennas to enable utilizing best path, and/or to perform signal combining. For example, a mobile device that comprises the communication system 200 may switch between antennas 206a and/or 206b during UMTS RF signal transmissions and/or receptions, substantially as described in FIG. 2A. A mobile device that comprises the communication system 220 may switch between antennas 206a and/or 206b during UMTS RF signal transmissions and/or receptions, and/or may utilized the MIMO combiner 224 to enable performing signal combining of UMTS RF signals transmitted and/or received via the antennas 206a and 206b; substantially as described in FIG. 2B.

Various embodiments of the invention may comprise a method and system for multiple shared antenna mobile devices. The wireless device 102 may comprise a plurality of antennas, for example 206a and 206b, which may be utilized during communications via various wireless interfaces. The wireless interfaces may comprise mobile interfaces, comprising, for example, CDMA, WCDMA, CDMA2000, HSDPA, GSM, GPRS, EDGE, and/or UMTS interface; wireless personal area network (WPAN) interfaces, comprising, for example, Bluetooth and/or ZigBee; and/or wireless local area network (WLAN) comprising, for example, WiFi and/or WiMAX. The plurality of antennas may be utilized during a communication via one of supported wireless interfaces via the mobile device 102. The mobile device 102 may switch between antennas in the plurality of antenna 206a and 206b, utilizing the RF switch 208 for example, to enable utilizing best path for UMTS RF signals transmitted and/or received. The mobile device 102 may also perform signal combining of RF signals received via the plurality of antenna 206a and 206b; and to enable a receiving end to perform signal combining of RF signals transmitted from the mobile device 102, via the plurality of antennas 206a and 206b. The MIMO combiner 224 may enable signal combining, to facilitate performing spatial diversity, for example. The MIMO combiner 224 may utilize the MRC equalizer 242 to perform signal combining and equalization.

Another embodiment of the invention may provide a machine-readable storage, having stored thereon, a computer program having at least one code section executable by a machine, thereby causing the machine to perform the steps as described herein for multiple shared antenna mobile devices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
   in a wireless device that comprises a plurality of antennas, wherein each of said plurality of antennas is configured to handle a particular one of a plurality of wireless protocols;
   during operation of said wireless device:
       determining whether one or more of said plurality of antennas provides greater transmission and/or reception of signal for at least one other of said plurality of wireless protocols, wherein said at least one other of said plurality of wireless protocols differs from said particular one of said plurality of wireless protocols; and
       reconfiguring said one or more of said plurality of antennas to handle said at least one other of said plurality of wireless protocols based on said determination.

2. The method according to claim 1, comprising switching among said plurality of antennas to enable transmission and/or reception of signals, via said one or more of said plurality of antennas, during communication via said at least one other of said plurality of wireless protocols.

3. The method according to claim 2, comprising switching among said plurality of antennas based on determination of path performance via each of said one or more of said plurality of antennas.

4. The method according to claim 1, comprising combining signals for said plurality of antennas to enable performing transmission and/or reception of signals during communication via said at least one other of said plurality of wireless protocols.

5. The method according to claim 4, wherein said signal combining comprises spatial diversity combining.

6. The method according to claim 5, comprising utilizing Maximal Ratio Combining (MRC) equalizer to perform said spatial diversity combining.

7. The method according to claim 1, comprising performing antenna gain adjustment when utilizing said one or more of said plurality of antennas during communication via said at least one other of said plurality of wireless protocols.

8. The method according to claim 1, wherein said plurality of wireless protocols comprise mobile interfaces, wireless personal area network (WPAN) interfaces, and/or wireless local area network (WLAN) interfaces.

9. The method according to claim 8, wherein said mobile interfaces comprise CDMA, WCDMA, CDMA2000, HSDPA, GSM, GPRS, EDGE, and/or UMTS interface.

10. The method according to claim 8, wherein said wireless personal area network (WPAN) interfaces comprise Bluetooth (IEEE 802.15) and/or ZigBee.

11. The method according to claim 8, wherein said wireless local area network (WLAN) interfaces comprise WiFi, and/or WiMAX (802.16).

12. The method according to claim 8, wherein said determination of said one or more of said plurality of antennas is based on proximity in frequency bands utilized for each of said mobile interfaces, wireless personal area network (WPAN) interfaces, and/or wireless local area network (WLAN) interfaces.

13. A system for wireless communication, the system comprising:
one or more circuits in a wireless device comprising a plurality of antennas, wherein each of said plurality of antennas is configured to handle a particular one of a plurality of wireless protocols;
said one or more circuits enable, during operation of said wireless device:
determination of whether one or more of said plurality of antennas provides greater transmission and/or reception of signal for at least one other of said plurality of wireless protocols, wherein said at least one other of said plurality of wireless protocols differs from said particular one of said plurality of wireless protocols; and
reconfiguration of said one or more of said plurality of antennas to handle said at least one other of said plurality of wireless protocols based on said determination.

14. The system according to claim 13, wherein said one or more circuits enable switching among said plurality of antennas to enable transmission and/or reception of signals, via said one or more of said plurality of antennas, during communication via said at least one other of said plurality of wireless protocols.

15. The system according to claim 14, wherein said one or more circuits enable switching among said plurality of antennas based on determination of path performance via each of said one or more of said plurality of antennas.

16. The system according to claim 13, wherein said one or more circuits enable combining signals for said plurality of antennas to enable performing transmission and/or reception of signals during communication via said at least one other of said plurality of wireless protocols.

17. The system according to claim 16, wherein said signal combining comprises spatial diversity combining.

18. The system according to claim 17, wherein said one or more circuits comprise a Maximal Ratio Combining (MRC) equalizer that enables performing of said spatial diversity combining.

19. The system according to claim 13, wherein said one or more circuits enable performing antenna gain adjustment when utilizing said one or more of said plurality of antennas during communication via said at least one other of said plurality of wireless protocols.

20. The system according to claim 13, wherein said plurality of wireless protocols comprise mobile interfaces, wireless personal area network (WPAN) interfaces, and/or wireless local area network (WLAN) interfaces.

21. The system according to claim 20, wherein said mobile interfaces comprise CDMA, WCDMA, CDMA2000, HSDPA, GSM, GPRS, EDGE, and/or UMTS interface.

22. The system according to claim 20, wherein said wireless personal area network (WPAN) interfaces comprise Bluetooth (IEEE 802.15) and/or ZigBee.

23. The system according to claim 20, wherein said wireless local area network (WLAN) interfaces comprise WiFi, and/or WiMAX (802.16).

24. The system according to claim 20, wherein said determination of said one or more of said plurality of antennas is based on proximity in frequency bands utilized for each of said mobile interfaces, wireless personal area network (WPAN) interfaces, and/or wireless local area network (WLAN) interfaces.

* * * * *